United States Patent
Charbonneaux et al.

(10) Patent No.: US 7,074,851 B2
(45) Date of Patent: Jul. 11, 2006

(54) METHOD FOR MAKING STABILISED POLYAMIDE COMPOSITIONS

(75) Inventors: Thierry Charbonneaux, Milan (IT); Jean-François Thierry, Francheville (FR)

(73) Assignee: Nylstar S.A., Saint Laurent Blangy (FR)

( * ) Notice: Subject to any disclaimer, the term of this patent is extended or adjusted under 35 U.S.C. 154(b) by 0 days.

(21) Appl. No.: 10/451,663

(22) PCT Filed: Dec. 21, 2001

(86) PCT No.: PCT/FR01/04151

§ 371 (c)(1), (2), (4) Date: Oct. 30, 2003

(87) PCT Pub. No.: WO02/053633

PCT Pub. Date: Jul. 11, 2002

(65) Prior Publication Data

US 2004/0068089 A1    Apr. 8, 2004

(30) Foreign Application Priority Data

Dec. 29, 2000 (FR) .................................. 00 17260

(51) Int. Cl.
*C08K 5/51* (2006.01)

(52) U.S. Cl. .................. 524/710; 524/717; 524/718; 524/719; 524/720; 524/736; 524/737; 524/738; 524/739; 524/740; 524/741; 528/310; 528/312; 528/313; 528/314; 528/319; 528/337

(58) Field of Classification Search ............... 528/310, 528/312–314, 319, 337; 524/710, 717–720, 524/736–741
See application file for complete search history.

(56) References Cited

U.S. PATENT DOCUMENTS

| | | | |
|---|---|---|---|
| 2,630,421 A | | 3/1953 | Stamatoff |
| 3,002,947 A | * | 10/1961 | Maple ........................ 524/845 |
| 3,679,624 A | * | 7/1972 | Edgar et al. ................. 524/707 |
| 3,935,162 A | * | 1/1976 | Golborn et al. ............. 524/124 |
| 4,520,190 A | | 5/1985 | Coffey et al. |
| 4,528,362 A | * | 7/1985 | Hofmann et al. ........... 528/336 |
| 4,603,192 A | | 7/1986 | Coffey et al. |
| 5,917,004 A | * | 6/1999 | Liedloff ...................... 528/332 |
| 6,495,660 B1 | * | 12/2002 | Long ......................... 528/480 |
| 6,812,323 B1 | * | 11/2004 | Breiner et al. .............. 528/314 |

FOREIGN PATENT DOCUMENTS

| | | |
|---|---|---|
| EP | 0 479 306 A | 4/1992 |
| FR | 951 924 A | 11/1949 |
| GB | 715 364 A | 9/1954 |
| GB | 793 196 A | 4/1958 |
| JP | 48 020220 B | 6/1973 |
| JP | 5320336 A | 12/1993 |
| JP | 7207019 A | 8/1995 |
| JP | 10053703 A | 2/1998 |
| WO | WO 94/19394 A | 9/1994 |
| WO | WO 97/05189 A | 2/1997 |

\* cited by examiner

*Primary Examiner*—Peter Szekely
(74) *Attorney, Agent, or Firm*—Buchanan Ingersoll, P.C.

(57) ABSTRACT

The invention relates to a process for preparing stabilized compositions based on polyamide. The stabilizer is a phosphorus stabilizer selected from phosphorous acid and hypophosphorous acid. It is introduced before or during the polymerization of the polyamide. The use of these stabilizers prevents foaming phenomena.

15 Claims, No Drawings

METHOD FOR MAKING STABILISED POLYAMIDE COMPOSITIONS

The invention relates to a process for preparing stabilized compositions based on polyamide and to the compositions obtainable by the process. The compositions of the invention may in particular be used for preparing synthetic yarns, fibres and filaments.

Polyamide is a synthetic polymer widely used for preparing yarns, fibres and filaments. These fibres, yarns and filaments are subsequently used to produce fabrics, and in particular dyed fabrics.

The polyamide may undergo degradation when subjected to elements or external conditions such as UV radiation, heat or inclement weather. Degradation may also be induced by the heat used during its preparation and/or shaping. This instability is manifested in instances of degradation, loss of mechanical properties, and colour changes. For some applications, these problems may become critical.

In order to enhance the stability of polyamides it is known to combine them with additives. Numerous additives are sold for this purpose. They are frequently classed according to their method of action: anti-oxidant, anti-UV, UV absorbers, etc.

In order to stabilize the polyamide, known antioxidants include in particular those containing hindered phenol units, phosphorus stabilizers, and light stabilizers containing at least one hindered amine unit.

For the stabilization, known phosphites include phosphites substituted by alkyl and/or aryl radicals, for example tris(2,4-di-tert-butylphenyl) phosphite. These stabilizers, when introduced into the polyamide preparation medium, cause severe foaming, which carries the risk of impairing the plant and the products produced. This severe foaming occurs even in the presence of conventional antifoams. To prevent this problem, the document WO 9418364 teaches, for example, introducing these stabilizers by mixing, in the melt state, the polyamide and a masterbatch of the stabilizer in a polyamide matrix.

Foaming problems may also be encountered with other stabilizing additives.

For various technical/economic reasons it is often preferred to introduce additives into a polymer other than by mixing in the melt state. Accordingly, it is often preferred to introduce these additives into the polymer synthesis medium before the polymerization is carried out. This method of introduction is generally referred to by the term "introduction during synthesis". Such a method makes it possible, among other things, to obtain very good dispersion of the additives in the polymer and sometimes to prevent polymer remelting operations. Moreover, the introduction of stabilizers during synthesis prevents instances of degradation during the preparation of the polyamide and/or its shaping.

It is an object of the invention to provide a process for preparing a stabilized composition based on polyamide, comprising a phosphorus-based additive introduced during synthesis.

The invention accordingly provides a process for preparing a stabilized composition based on polyamide, comprising a phosphorus stabilizer additive, characterized in that the phosphorus stabilizer additive is selected from phosphorous acid and hypophosphorous acid and in that it is introduced into the polyamide polymerization medium before or during the polymerization phase. Its proportion by weight in the composition is preferably between 0.01% and 0.04%.

In one preferred embodiment, it is possible to use at least one other stabilizer additive introduced into the polyamide polymerization medium before or during the polymerization phase. The additional additive is selected from hindered phenol antioxidants and light stabilizers containing at least one hindered amine unit (hindered amine light stabilizers, HALS). It is also possible to use a combination of these two additives with the phosphorus stabilizer. The presence of the phosphorus stabilizer selected from phosphorous acid and hypophosphorous acid additionally reduces the foaming due to the further individual additives.

The light stabilizers containing at least one hindered amine unit enhance the light stability of the polyamide and prevent a loss of colour brightness when the polyamide is dyed or comprises colour pigments.

The process for preparing polyamide according to the invention may be selected from all known processes with the proviso that the phosphorus stabilizer, and where appropriate the other stabilizer additives, are introduced into the polymerization medium before the polymerization phase has properly started. It is possible for a product having a low degree of polycondensation to be formed before the additives are introduced.

Where two or more stabilizer additives are used, they may be introduced into the polymerization medium either in succession, at different stages of the process before the polymerization phase, or at the same time.

The light stabilizer containing at least one hindered amine unit is preferably selected from 4-amino-2,2,6,6-tetramethylpiperidine, 4-carboxy-2,2,6,6-tetramethylpiperidine, aromatic compounds of formula (I) containing two or three carbonyl functions and including at least one group containing a hindered amine unit, the said unit being part of a group attached to one of the carbonyl functions. The carbonyl function may be part of an amide, ester or ester-amide group.

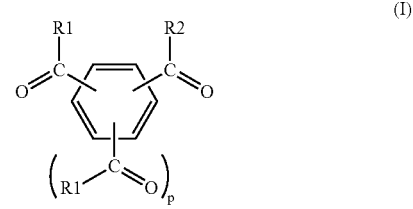

(I)

in which p is 0 or 1 and R1 and R2 are identical or different groups of which at least one contains a hindered amine unit. Where p is 0, the additive may have a chemical structure (II) or (III), defined as follows:

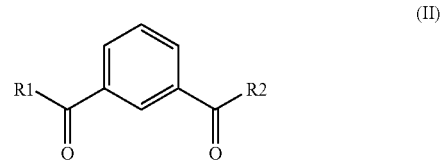

(II)

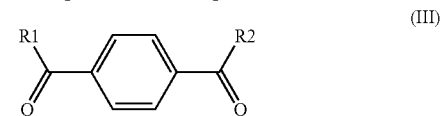

(III)

in which R1 and R2 are identical or different groups of which at least one contains a hindered amine unit, a group not containing a sterically hindered amine unit which may be selected from $C_1$ to $C_{18}$ alkoxy; aminoalkyl optionally substituted by halogen, $C_1$ to $C_5$ alkoxy, carbonyl groups, carbamyl groups or alkoxycarbonyl groups; and $C_3$ to $C_5$ epoxides;

the group or groups containing a sterically hindered amine unit may be selected from the following compounds of formula (IV):

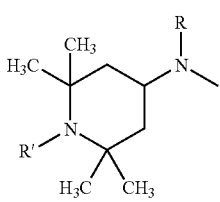

in which R and R' are selected independently from hydrogen, $C_1$ to $C_{12}$ alkyl, $C_1$ to $C_8$ alkoxy, groups of structure —COR3, where R3 is selected from hydrogen and $C_1$ to $C_6$ alkyl; phenyl; the group —COO($C_1$ to $C_4$ alkyl); the group of structure NR5R6, where R5 and R6 are selected independently from hydrogen, $C_1$ to $C_{12}$ alkyl, $C_5$ or $C_6$ cycloalkyl, phenyl, alkylphenyl in which the alkyl is from $C_1$ to $C_{12}$, or R5 and R6 form, with the nitrogen atom to which they are bonded, a ring of 5 to 7 atoms optionally including an oxygen atom or another nitrogen atom, preferably forming a group from the class of the piperidines or morpholines.

One preferred compound for the light stabilizer is the compound of formula (V):

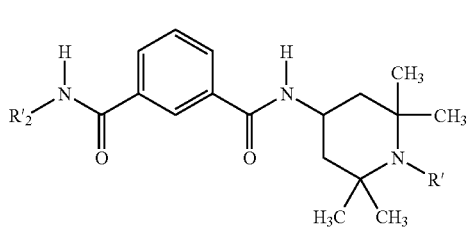

in which $R'_2$ is selected from $C_1$ to $C_{20}$ alkyl, $C_1$ to $C_{20}$ aminoalkyl, $C_1$ to $C_{20}$ substituted aminoalkyl, $C_1$ to $C_{20}$ hydroxyalkyl, $C_1$ to $C_{20}$ alkene, $C_1$ to $C_{20}$ substituted alkene, alkoxyalkyl groups, $C_{1-20}$-oxy-N—$C_{1-20}$-alkyl groups, $C_1$ to $C_{10}$—N-cycloalkyl groups, $C_1$ to $C_{10}$—N-cycloalkyl groups substituted by a group —COR4 where R4 is selected from hydrogen, $C_1$ to $C_6$ alkyl, phenyl, groups $C_{1-20}$COO(H or $C_{1-4}$ alkyl) and in which R' is as defined for the formula (IV). The light stabilizer is more preferably still the compound of formula (VI)

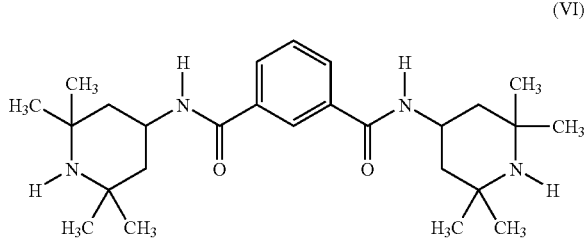

This additive is supplied, for example, by Clariant under the name Nylostab S-EED.

The proportion in the composition of the light stabilizer additive is advantageously between 0.15% and 0.5% by weight.

The light stabilizer of formula (VI) is preferably introduced into the polymerization medium in the form of a suspension or a solution in water, caprolactam, or a water/caprolactam mixture. The concentration by weight in the solution or in the suspension may, for example, be between 5% and 50%. Preference is given to using a mixture of caprolactam and water containing more caprolactam than water. The form of introduction, suspension or solution, may depend in part on the temperature and pressure conditions at the time of introduction.

The antioxidant is preferably selected from alkylated monophenols, alkylated hydroxyquinones, alkylidenebisphenols, benzyl compounds with alkyl hindrance, acylaminophenols, and esters of β-(3,5-di-tert-butyl-4-hydroxyphenyl)propionic acid. Mention is made in particular of 1,3,5-trimethyl-2,4,6-tris(3,5-di-tert-butyl-4-hydroxybenzyl) benzene, supplied for example by CIBA under the name IRGANOX 1330, and N,N'-hexamethylene bis(3,5-di-tert-butyl-4-hydroxyhydrocinnamamide), supplied for example by CIBA under the name IRGANOX 1098.

The proportion of the second additive in the composition is advantageously between 0.10% and 0.30% by weight.

The stabilized composition based on polyamide may comprise other additives in addition to the additives already mentioned. These additives may be introduced by mixing them into the polymerization medium or by mixing them in the melt phase. By way of example of such additives, mention is made of pigments or delustrants intended to give the compositions a matt and/or coloured appearance, flame retardants, and other stabilizers.

In one particular embodiment of the invention, the compositions comprise a delustrant in the form of particles based on titanium dioxide or zinc sulphide. The concentration of particles in the composition may be between 0.01% and 3% by weight. It is advantageously greater than 1%. The delustrant is preferably introduced into the polymerization medium before or during the polymerization phase. In this embodiment, the particles are advantageously introduced in the form of an aqueous suspension. The particles based on titanium dioxide are advantageously coated. The coating in question may comprise, for example, a silica-based coating with, where appropriate, alumina and/or a manganese oxide.

The composition prepared by the process of the invention may be based on a polyamide of the type obtained by polymerization from a lactam and/or an amino acid, or based on a polyamide of the type obtained by polycondensation of a dicarboxylic acid and a diamine. The compositions are preferably based on polyamide 6, polyamide 66, and blends and copolymers based on these polyamides. It may in particular comprise a polyamide 6,6/6 copolymer when use is made of a stabilizer of formula (VI) introduced into the polymerization medium in the form of a solution or dispersion in a liquid comprising caprolactam.

In one particular embodiment, the composition is based on polyamide 6,6. One advantageous preparation process starts from a hexamethylenediammonium adipate salt, preferably in the form of a solution at salt concentrations of between 50 and 70% by weight. This process, continuous or batchwise, comprises a first phase of water evaporation and a second phase of polymerization by polycondensation.

The compositions may be shaped into yarns, fibres and filaments, directly after polymerization, without intervening steps of solidification and remelting. They may also be shaped into granules, intended for remelting for later definitive shaping, for example for the production of moulded articles or for the production of yarns, fibres or filaments.

The yarns, fibres and filaments shaped from compositions obtained by the process of the invention are produced by melt spinning: the composition is extruded in the melt state through dies comprising one or more orifices.

All techniques of melt spinning may be used. The filaments may be drawn or drafted, in the form of a multifilament yarn or a roving, in one continuous step or intermittently, and may undergo various treatments: sizing, texturing, setting, etc.

For the production of multifilament yarns, mention is made in particular of high-speed spinning processes, at spinning speeds of more than 3 500 m/min. Such processes are often designated by the following terms: POY (partially oriented yarn), FOY (fully oriented yarn), and SDY (spindraw yarn). These yarns may further be textured, depending on their intended use. The yarns obtained by these processes are especially suitable for the production of woven or knitted fabrics.

To produce fibres, the filaments may, for example, be brought together in sliver or web form, directly after spinning or intermittently, drawn, textured and cut. The fibres obtained may be used to produce nonwovens or spun yarns.

The compositions may also be used for the production of flock tow.

The yarns, fibres and filaments, and the articles obtained from the yarns, fibres and filaments, may be dyed. Mention is made in particular of bath-dyeing or jet-dyeing processes. The preferred dyeings are acid, metallized or non-metallized dyeings.

The compositions of the invention allow articles to be obtained whose colour fastness with respect to light is excellent. They also make it possible to obtain improved fastness of the dyeing to washing.

Further details and advantages of the invention will appear more clearly on viewing the examples given below solely by way of indication.

EXAMPLE 1

A copolymer based on polyamide 66 is prepared from 3 590 kg of an aqueous hexamethylenediammonium adipate salt solution with a concentration of 62% by weight, to which the following are added:
  3 940 g of a 25% aqueous acetic acid solution
  1 000 g of a 40% aqueous phosphorous acid solution
  300 g of Rhodia Silcolapse 5020 antifoam
  a dispersion by mixing 40 l of caprolactam, 10 l of water, 6 kg of Nylostab SEED sold by Clariant, 3 kg of Irganox 1098 sold by Ciba.

The polyamide is prepared according to a standard process comprising a step of concentrating this solution in an evaporator, a step of polycondensation in a stirred autoclave reactor, with a distillation phase of approximately 45 minutes at a pressure plateau of 1.85 MPa for which the final temperature is 245° C., a decompression phase of approximately 35 minutes from 1.85 MPa to 0.1 MPa at a final temperature of 260° C., and a finishing phase of approximately 30 minutes for which the final temperature is 270° C.

During the distillation phase under pressure, after 6 minutes, 128 kg of a 25% by weight aqueous dispersion of coated titanium dioxide particles are added.

No foaming is observed during the decompression phase. A copolymer based on polyamide 6,6 is obtained, containing 2.0% by weight of polyamide 6 units and 1.6% of titanium dioxide.

The copolyamide is spun by a spindraw process. The winding speed is 4 500 m/min. The linear density of the yarns obtained is 78 dtex per 68 filaments. The tenacity of the yarn is 42 cN/tex and the elongation at break is 38%.

A knitted fabric is produced from the yarns. The fabric is washed at 60° C. for 20 minutes in the presence of a detergent composition composed of 2 g/l of Sandozine MRN sold by Clariant, 2 g/l of Sirrix AR and 2 g/l of sodium carbonate. The fabric is then heat-set at 190° C. for 45 seconds.

The fabric is dyed by immersion at 98° C. for 45 minutes at a pH of 6 in the presence of the following:
  dyes sold by Ciba
  0.0247% by weight of Irgalan yellow 3 RV 250%
  0.0170% by weight of Irgalan bordeaux EL 200%
  0.2220% by weight of Irgalan grey 200%
  2% by weight of a levelling agent, C14 sold by CHT
  0.5 g/l of sodium acetate The light fastness of the fabric was tested using a Xenotest 450 apparatus in accordance with the standard DIN 75202 over 4 cycles (FAKRA test). After 4 cycles, the rating is 6–7.

EXAMPLE 2

Comparative

A copolyamide is prepared by the process of Example 1, without additives. The rating is 5.

EXAMPLE 3

Compositions based on polyamide 6,6 were prepared in a 300 ml reactor equipped with a window allowing any foaming to be observed. The polyamide is prepared from a hexamethylenediammonium adipate salt in solution by a process similar to that of Example 1. The decompression phase is carried out in 10 minutes so as to be implemented under conditions similar to the conditions of Example 1 as regards the sensitivity to foaming. During the preparation, additives are added:
  coated titanium dioxide particles (1.6% by weight relative to the composition obtained). The particles are added 5 minutes after the beginning of the plateau at 1.85 MPa.
  Phosphorous acid in solution: added to the solution of the hexamethylenediammonium adipate salt
  Nylostab SEED sold by Clariant, Irganox 1098, Irgafos 168 (phosphorus stabilizer), Irgafos 12 (phosphorus stabilizer), sold by Ciba. These products are introduced into the melted caprolactam at 150° C. during the decompression phase.

A variety of additives are tested, and also different combinations. The results are set out in Table 1.

TABLE 1

| Irganox 198 | Irgafos 168 | Irgafos 12 | $H_3PO_3$ | Nylostab | Level of foaming |
|---|---|---|---|---|---|
| 0.15% | / | / | / | / | 1 |
| / | 0.15% | / | / | / | 1 |
| / | / | / | / | 0.3% | 1 |
| 0.15% | / | 0.15% | / | 0.3% | 3 |
| 0.15% | / | / | 0.02% | 0.3% | 0 |

The amounts of additives are expressed by weight relative to the composition obtained. The level of foaming is evaluated by the height of the foam in the reactor: 0 for zero foaming, 3 for extensive foaming.

It is observed that the phosphorous acid inhibits the foaming induced by the presence of the other additives.

The invention claimed is:
1. Process for preparing a stabilized composition based on polyamide, comprising a phosphorus stabilizer additive, wherein the phosphorus stabilizer additive is selected from the group consisting of phosphorous acid and hypophosphorous acid and in that it is introduced into the polyamide polymerization medium before or during the polymerization phase, and wherein the composition comprises at least one other stabilizer additive introduced into the polyamide polymerization medium before or during the polymerization phase, said other stabilizer additive selected from the group consisting of a light stabilizer containing at least one hindered amine unit and mixtures thereof with a hindered phenol antioxidant, wherein said light stabilizer is the compound of formula (VI):

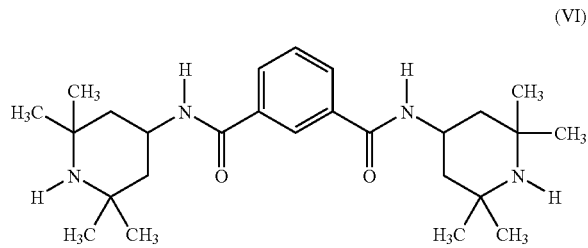

(VI)

and the hindered phenol antioxidant is selected from the group consisting of alkylated monophenols: alkylated hydroxyquinones; alkylidene bisphenols, benzyl compounds with alkyl hindrance, acylaminophenols, and esters of β-(3, 5-di-tert-butyl-4-hydroxyphenyl) propionic acid.

2. Process according to claim 1, wherein the composition comprises particles based on titanium dioxide introduced before the polyamide polymerization phase.

3. Process according to claim 2, wherein the proportion by weight of particles based on titanium dioxide is greater than 1% by weight relative to the mass of the composition.

4. Process according to claim 2, wherein the particles based on titanium dioxide are coated.

5. Process according to claim 1, wherein the light stabilizer is introduced in solution or in suspension in a liquid selected from the group consisting of water, caprolactam and mixtures thereof.

6. Process according to claim 1, wherein the polyamide is selected from the group consisting of polyamide 6, polyamide 6,6, and copolymers thereof.

7. Process according to claim 5, wherein the polyamide is polyamide 6,6 produced from a solution in water of hexamethylenediammonium adipate, the process comprising a water evaporation phase followed by a polycondensation phase, the solution or suspension of light stabilizer containing a hindered amine being introduced before the evaporation step.

8. Process according to claim 1, comprising a discontinuous process for producing a composition based on polyamide 6,6.

9. Composition based on polyamide obtainable by a process according to claim 1.

10. Composition according to claim 9, which comprises from 0.01 to 0.04% by weight of the additive selected from the group consisting of phosphorous acid and hypophosphorous acid.

11. Composition according to claim 1, which comprises from 0.15% to 0.5% of said light stabilizer and from 0.10% to 0.30% by weight of said hindered phenol antioxidant.

12. Composition according to claim 9, which comprises particles based on titanium dioxide.

13. Composition according to claim 12, wherein the particles based on titanium dioxide are coated.

14. Yams, fibres and filaments obtained by shaping a composition according to claim 9.

15. Woven, knitted, nonwoven or flocked, dyed articles obtained from yams, fibres and filaments according to claim 14.

* * * * *